United States Patent
Lin et al.

(10) Patent No.: US 7,668,050 B2
(45) Date of Patent: Feb. 23, 2010

(54) TRACKING ERROR CONTROL SYSTEM AND METHOD

(75) Inventors: Ying-Ta Lin, Hsinchu (TW); Ren-Te Lin, Hsinchu (TW)

(73) Assignee: Lite-On It Corp., Taipei (TW)

( * ) Notice: Subject to any disclaimer, the term of this patent is extended or adjusted under 35 U.S.C. 154(b) by 736 days.

(21) Appl. No.: 11/023,072

(22) Filed: Dec. 27, 2004

(65) Prior Publication Data

US 2005/0157607 A1 Jul. 21, 2005

(30) Foreign Application Priority Data

Jan. 15, 2004 (TW) .............................. 93101070 A (51) Int. Cl.
*G11B 7/00* (2006.01)

(52) U.S. Cl. .............. 369/44.25; 369/44.11; 369/44.28; 369/53.23; 369/53.28; 369/44.29

(58) Field of Classification Search .............. 369/44.11, 369/44.13, 44.25, 44.27, 44.32, 44.36, 53.23, 369/53.28, 53.32, 44.29, 44.35

See application file for complete search history.

(56) References Cited

U.S. PATENT DOCUMENTS

| | | | | |
|---|---|---|---|---|
| 5,291,466 A | * | 3/1994 | Kwak | 369/44.35 |
| 6,317,396 B1 | * | 11/2001 | Kuribayashi | 369/44.35 |
| 7,142,486 B2 | * | 11/2006 | Masui et al. | 369/44.29 |
| 2001/0006494 A1 | * | 7/2001 | Park | 369/44.25 |
| 2001/0010669 A1 | * | 8/2001 | Chan | 369/44.28 |
| 2003/0026175 A1 | * | 2/2003 | Otsuka et al. | 369/44.13 |
| 2003/0117912 A1 | * | 6/2003 | Yoshimi et al. | 369/44.28 |
| 2004/0136285 A1 | * | 7/2004 | Chen et al. | 369/47.22 |

* cited by examiner

*Primary Examiner*—Wayne R Young
*Assistant Examiner*—Dionne H Pendleton
(74) *Attorney, Agent, or Firm*—Kirton & McConkie; Evan R. Witt (57) ABSTRACT

A tracking error control system includes a tracking error signal generator in communication with an optical pickup head, a DC detector in communication with the tracking error signal generator and a comparator in communication with the DC detector and the tracking error signal generator. The operating optical signals received by the optical pickup head are operated with an offset signal to generate a tracking error signal. A direct current voltage of the tracking error signal is detected and compared with a reference voltage. The offset signal is adjusted according to the comparison result and fed back to the tracking error signal generator to adjust the tracking error signal.

14 Claims, 6 Drawing Sheets

TRACKING ERROR CONTROL SYSTEM AND METHOD

FIELD OF THE INVENTION

The present invention relates to tracking error control system and method, and more particularly to tracking error control system and method for use in an optical reproducing/recording apparatus.

BACKGROUND OF THE INVENTION

Figure 1:
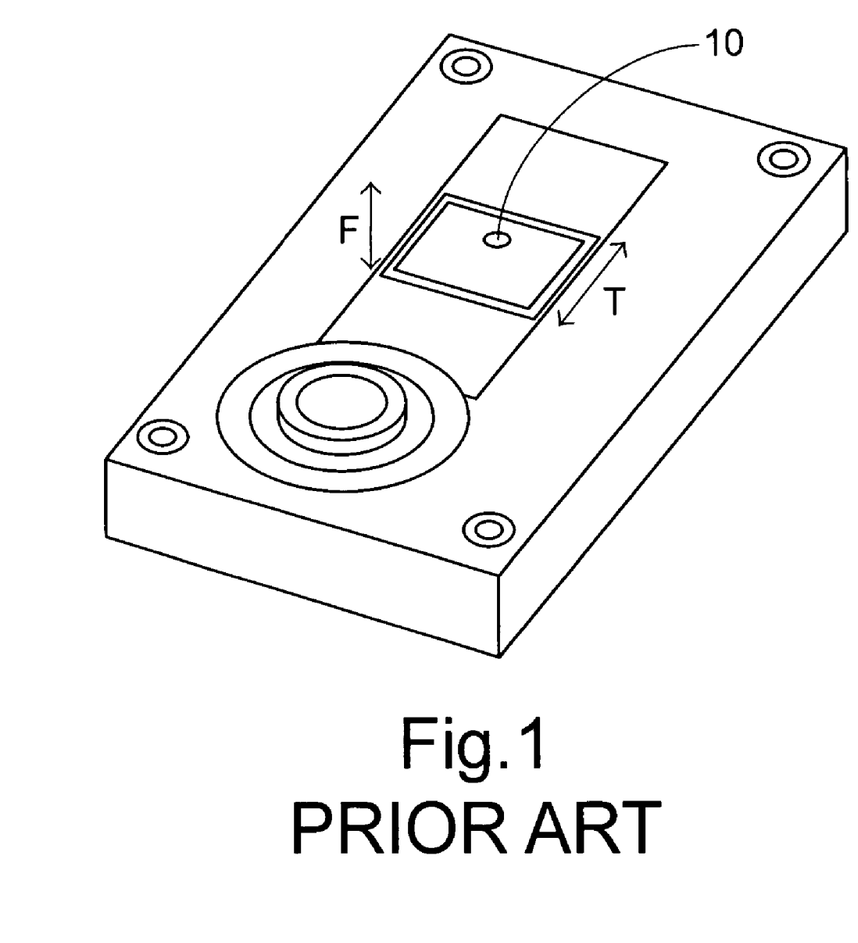
FIG. 1 schematically illustrates a typical optical pickup head.

Optical disks such as compact disks (CDs), video compact disks (VCDs) and digital versatile disk (DVDs) are playable by optical storage devices. When an optical pickup head of an optical storage device operates, the light emitted by a light source such as a laser diode is focused by an object lens of the optical pickup head on an optical disk, and the light reflected by the optical disk is transmitted to a light sensor to realize information from the disk. Referring to FIG. 1, the optical pickup head 10 moves along two main directions, i.e. a direction perpendicular to the disk surface, referred as a focusing direction F, and a direction parallel to the disk surface, referred as a tracking direction T.

Figure 2:
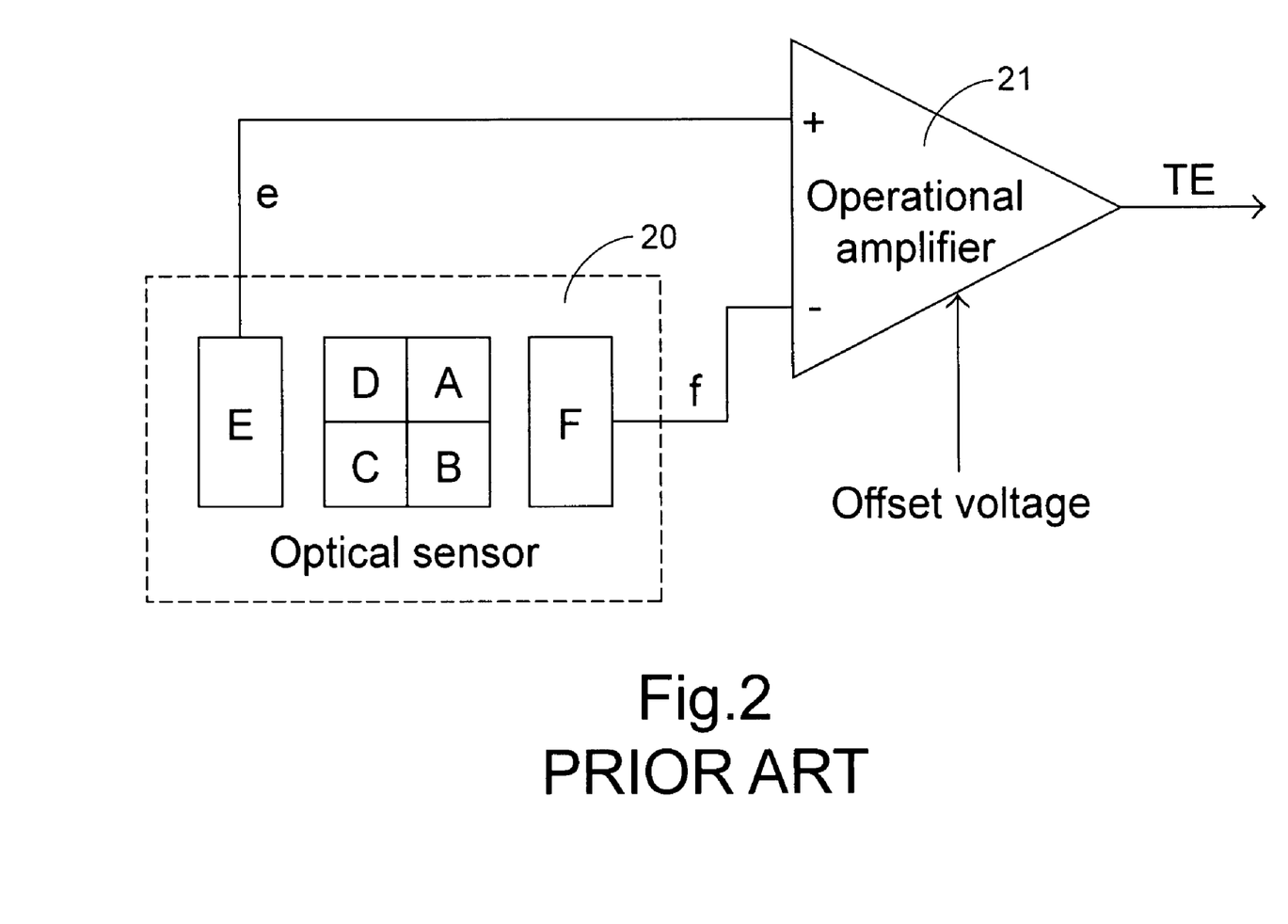
FIG. 2 is a functional block diagram illustrating a typical tracking control system for an optical pickup head.
Figure 3A:
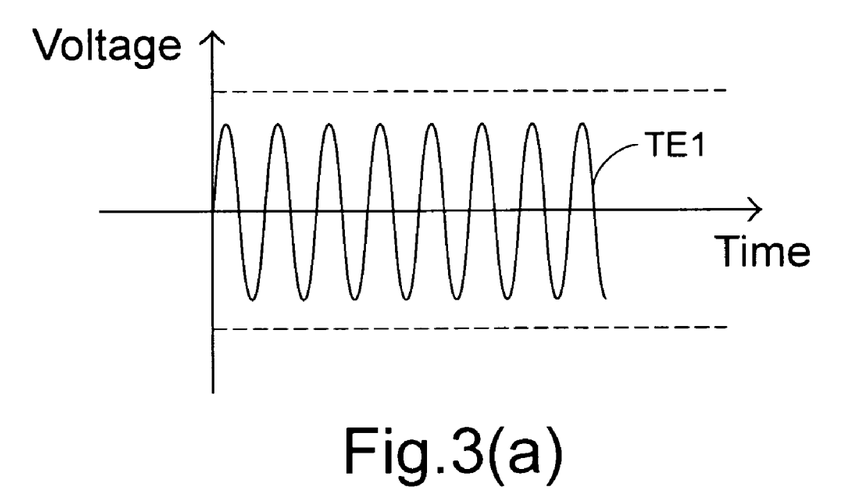
FIGS. 3(a) and 3(b) respectively show ideal and exemplified practical situations of tracking error signals.

During operation, a focusing error and a tracking error usually arise on the rotating disk. The focusing error is generally caused by vibration of the disk in the focusing direction F, and the tracking error is caused by eccentricity of the disk in the tracking direction T. To correct these errors, a tracking control system for an optical pickup head was developed, as can be seen in FIG. 2. The optical sensor 20 of the optical pickup head has six light receiving parts A, B, C, D, E and F for producing output signals, when receiving light reflected from the optical disk. The output signals e and f are processed through an operational amplifier 21 to produce a tracking error signal TE. An ideal tracking error signal TE1 would be an alternating current (AC) signal distributing in a preset amplitude range without any direct current (DC) component effect, as shown in FIG. 3(a). That is, the DC level of the AC signal is preferably zero. The waveform of the tracking error signal TE1 is symmetrical with respect to the zero level 0. It is known to those skilled in the art that the zero level, which indicates the best tracking condition, is an index for performing a feedback control.

Figure 3B:
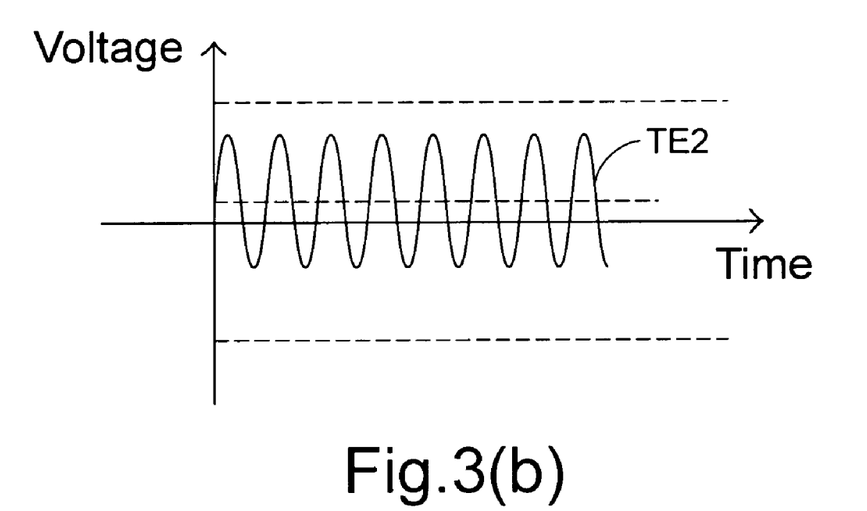

In practice, however, the tracking error signal generated through the optical sensor 20 and operational amplifier 21 may involve non-zero DC level, as exemplified by the signal TE2 shown in FIG. 3(b). As is known, the effect of DC component varies with conditions such as resolving speed, tracking position or quality of disc. Once the tracking error signal TE fluctuates, error situation of the tracking error zero cross (TEZC) signal derived from the tracking error signal TE may occur so as to further adverse the seeking operation of the optical pickup head. For example, the optical pickup head is supposed to jump from an outer track of a disc to an inner track in a seeking operation according to the TEZC signal. If the TEZC signal referred by the optical pickup head is erroneous in the meantime, the optical pickup head may wrongly jump further outwards from the outer track so as to read wrong information. Further, if the starting outer track of that seeking operation is near the outer edge of the disc, the outward jumping may result in jumping out of the disc range and even hitting other parts of the optical disc drive. Therefore, it is desirable to modify the tracking error signal TE2 in order to eliminate the non-zero DC component, thereby stabilizing the TE signal, obtaining accurate TEZC signal and precisely moving the optical pickup head. Currently, to input an offset voltage into the operational amplifier 21, as shown in FIG. 2, is one of the accesses to adjust the TE signal.

Conventionally, the level of the offset voltage is determined as soon as the initial calibration of the optical disc drive is performed. Once the offset voltage has been determined according to certain calculation, the constant offset voltage is inputted to the operational amplifier 21 to modify the tracking error signal TE in all following procedures. In other words, no matter how the seeking or tracking conditions change, the offset voltage is kept the same. Therefore, the conventional TE-signal adjustment using a constant offset voltage is not precise enough for obtaining a reliable TE signal. Moreover, an improper offset voltage may further adversely affect the seeking operation due to the resulting asymmetric waveform of the TE signal.

SUMMARY OF THE INVENTION

Therefore, the present invention provides tracking error control system and method for dynamically adjusting the offset voltage so as to obtain a reliable tracking error signal.

The present invention relates to a tracking error control system of an optical reproducing/recording apparatus, which comprises a tracking error signal generator in communication with an optical pickup head of the optical reproducing/recording apparatus, operating optical signals received by the optical pickup head with an offset signal inputted therein to generate a tracking error signal; a DC detector in communication with the tracking error signal generator for detecting a direct current voltage of the tracking error signal; and a comparator in communication with the DC detector and the tracking error signal generator for comparing the direct current voltage with a reference voltage and adjusting the offset signal to be inputted into the tracking error signal generator according to the comparison result.

In an embodiment, the tracking error signal generator includes an operational amplifier.

In an embodiment, the DC detector includes: a resistor coupled to the output of the racking error signal generator; a capacitor coupled to the resistor and the reference voltage; and a signal output end disposed at a node between the resistor and the capacitor and outputting therefrom a low-pass voltage signal indicative of the direct current voltage of the tracking error signal.

In an embodiment, the comparator adjusts the offset signal to approximate the direct current voltage to the reference voltage in response to an enable signal.

In an embodiment, the tracking error control system further comprises a discriminator in communication with the comparator, which detects a seeking operation of the optical pickup head according to a TEZC signal and asserts the enable signal when an inward seeking operation of the optical pickup head is determined.

The present invention further relates to a tracking error control method for use in an optical reproducing/recording apparatus. The tracking error control method comprises steps of: a) operating optical signals received by an optical pickup head of the optical reproducing/recording apparatus with an offset signal to generate a tracking error signal; b) detecting a direct current voltage of the tracking error signal; c) adjusting the offset signal according to the direct current voltage; and d) repeating the step a) with the adjusted offset signal.

In an embodiment, the tracking error control method further comprises a step, before the step a), of detecting a seeking operation of the optical pickup head. The steps a)~d) are performed when an inward seeking operation of the optical pickup head is determined.

In an embodiment, in the step c), the offset signal is adjusted according to the comparing result of the direct current voltage with a reference voltage in order to approximate the direct current voltage to the reference voltage.

In an embodiment, an offset voltage indicated by the offset signal is lowered when the direct current voltage is greater than the reference voltage, and the offset voltage is enlarged when the direct current voltage is no greater than the reference voltage.

In an embodiment, a plurality of levels of the offset voltage are preset for selectively responding to the comparing result of the direct current voltage with the reference voltage.

The present invention also relates to a tracking error control method for use in an optical reproducing/recording apparatus, which comprises steps of: generating a tracking error signal in response to optical signals received by an optical pickup head of the optical reproducing/recording apparatus; dynamically outputting a direct current voltage of the tracking error signal to be optionally compared with a reference voltage; lowering the offset voltage to reduce the direct current voltage of the tracking error signal to approximate the direct current voltage to the reference voltage when the direct current voltage is greater than the reference voltage; and enlarging the offset voltage to raise the direct current voltage of the tracking error signal to approximate the direct current voltage to the reference voltage when the direct current voltage is less than the reference voltage.

The present invention will become more readily apparent to those ordinarily skilled in the art after reviewing the following detailed description and accompanying drawings, in which:

DETAILED DESCRIPTION OF THE PREFERRED EMBODIMENT

Figure 4:
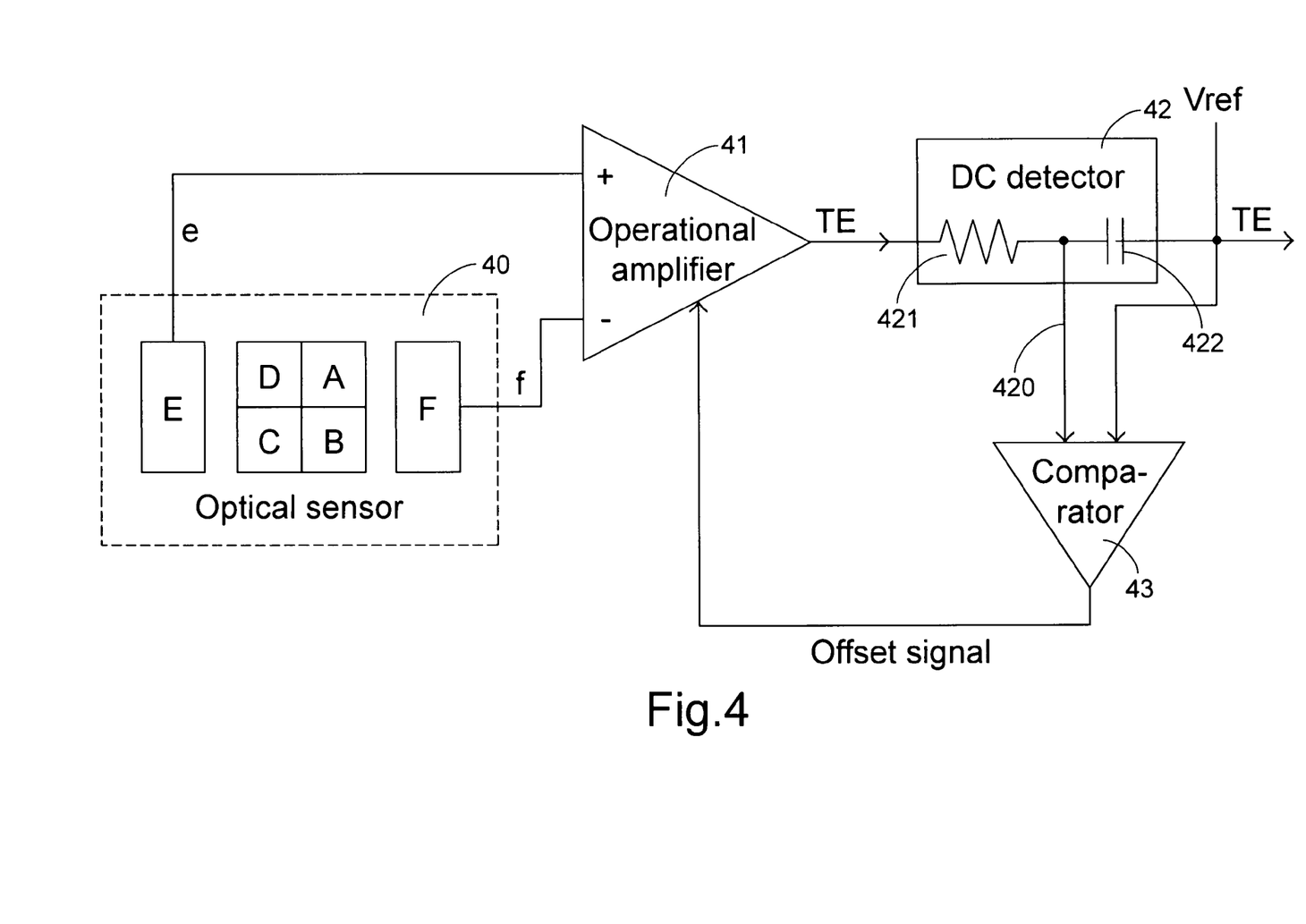
FIG. 4 is a functional block diagram illustrating a tracking control system for an optical pickup head according to an embodiment of the present invention.

Please refer to FIG. 4. An embodiment of a tracking error control system includes an operational amplifier 41 in communication with an optical pickup head comprising an optical sensor 40, a DC detector 42 in communication with the operational amplifier 41 and a comparator 43 in communication with the DC detector 42 and the operational amplifier 41. The optical sensor 40 of the optical pickup head has six light receiving parts A, B, C, D, E and F for producing output signals, when receiving light reflected from an optical disc. The output signals e and f are processed through the operational amplifier 41 to produce a tracking error signal TE. The DC detector 42 includes a resistor 421 and a capacitor 422, and detects a low-pass signal of the tracking error signal as the direct current voltage. The direct current voltage is then outputted from a signal output end 420 disposed at the node between the resistor 421 and capacitor 422 to the comparator 43. The comparator 43 compares the direct current voltage with a reference voltage Vref and outputs an offset signal to the operational amplifier 41 according to the comparison result. In response to the offset signal, the direct current voltage of the TE signal is adjusted, and the offset signal is further adjusted accordingly, as mentioned above, thereby dynamically adjusting the offset signal inputted to the operational amplifier 41. The adjustment of the offset signal depends on the comparison result of the direct current voltage with the reference voltage in order to approximate the direct current voltage to the reference voltage.

Figure 5:
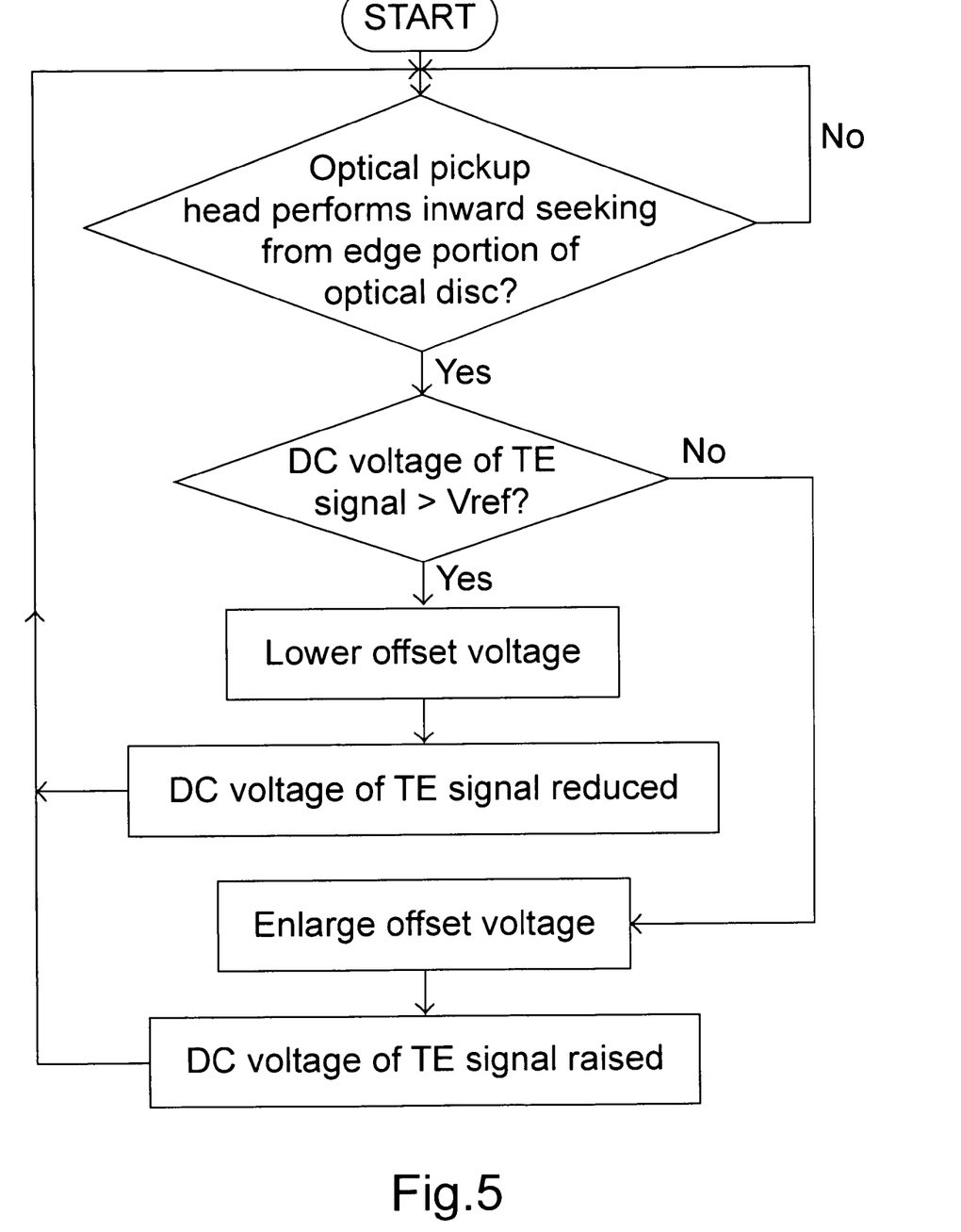
FIG. 5 is a flowchart illustrating the tracking error control method according to the present invention.

In other words, by dynamically detecting and outputting a direct current voltage of the tracking error signal and comparing the direct current voltage with the reference voltage, the offset signal can be dynamically adjusted and fed back to the operational amplifier 41 to adjust the TE signal. For example, a plurality of offset voltage levels are preset and selectively respond to the comparison result. When the direct current voltage is detected to be greater than the reference voltage, a lower level of offset voltage is inputted so as to reduce the direct current voltage of the tracking error signal. On the other hand, a greater level of offset voltage is selected so as to raise the direct current voltage when the direct current voltage is detected to be no less than the reference voltage. By this way, the DC variation with conditions such as resolving speed, tracking position or quality of disc can be properly compensated. Moreover, the problems of jumping out of the disc range and even hitting other parts of the optical disc drive due to the wrong seeking direction of the optical pickup head, particularly when the optical pickup head is performing an inward seeking operation from the edge portion of the optical disc, can be solved. The tracking error control method according to this embodiment is summarized in the flowchart of FIG. 5.

Figure 6:
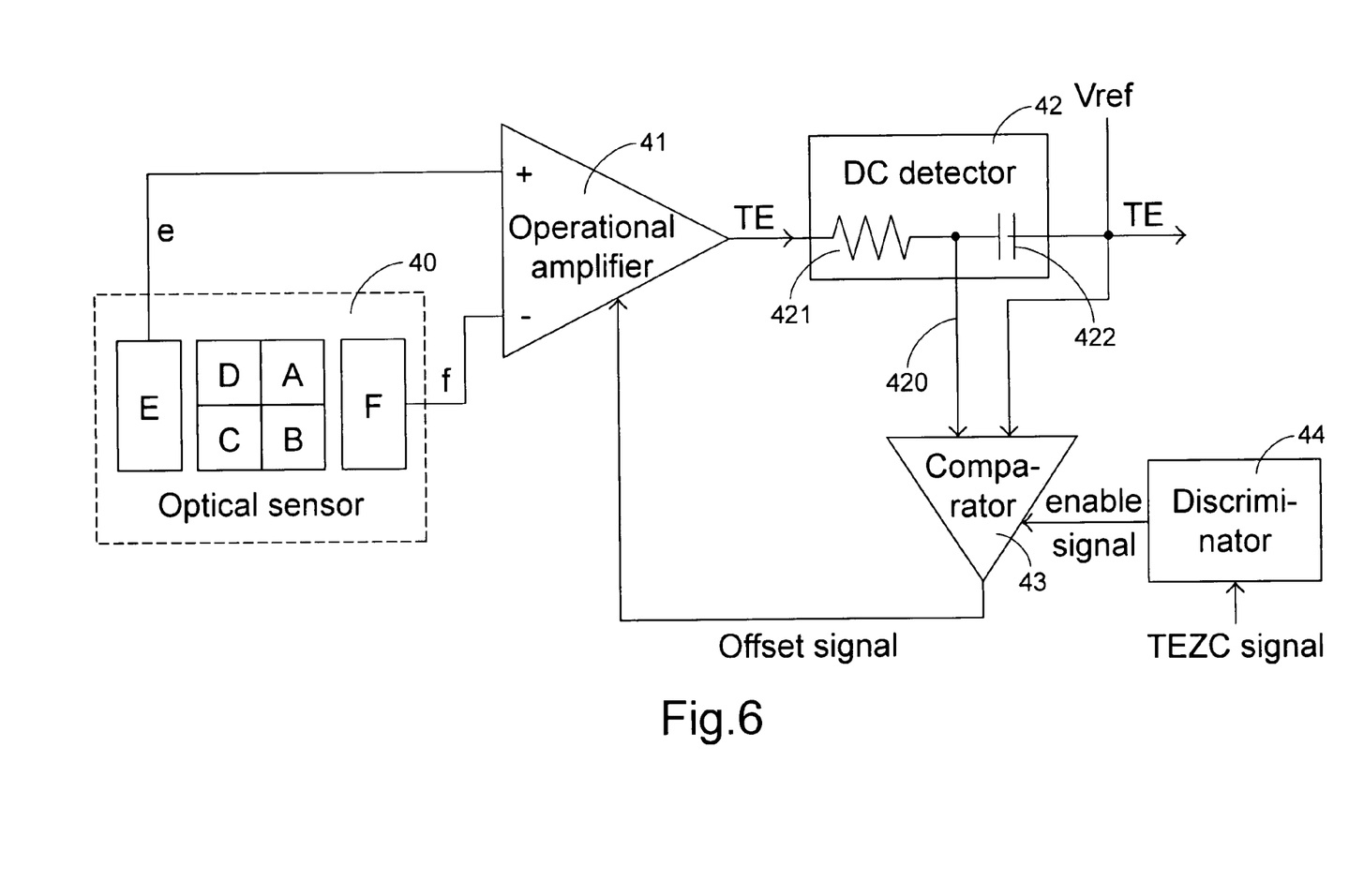
FIG. 6 is a functional block diagram illustrating a tracking control system for an optical pickup head according to another embodiment of the present invention.

As is understood, the dynamic adjustment of the offset signal requires frequent operation of the comparator 43. Therefore, the power consumption could become an issue for the system design. Since the tracking error control is particularly critical when the optical pickup head is performing an inward seeking operation from the edge portion of the optical disc, the tracking error control of the present invention can be specifically enabled under this circumstance only. This purpose can be achieved by asserting an enable signal from a discriminator 44 to the comparator 43 only when an inward seeking operation of the optical pickup head is determined or specifically an inward seeking operation of the optical pickup head from the edge portion of the optical disc is determined, for example, by referring to the TEZC signal. A functional block diagram of this embodiment is schematically shown in FIG. 6. As for the determination of the "edge portion" of the optical disc, it depends on practical requirement, and for example, could be the outer portion covering ⅓ of the total tracks.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A tracking error control system of an optical reproducing/recording apparatus, comprising:

a tracking error signal generator in communication with an optical pickup head of the optical reproducing/recording apparatus, said tracking error signal generator operating optical signals received by said optical pickup head with an offset signal inputted therein to generate a tracking error signal;

a DC detector in communication with said tracking error signal generator for detecting a direct current voltage of said tracking error signal; and a comparator in communication with said DC detector and said tracking error signal generator for comparing said direct current voltage with a reference voltage and adjusting said offset signal to be inputted into said tracking error signal generator according to the comparison result, wherein said comparator adjusts said offset signal to approximate said direct current voltage to said reference voltage in response to an enable signal input to said comparator, wherein said enable signal is input to said comparator when said optical pickup head performs an inward seeking operation.

2. The tracking error control system according to claim 1 wherein said tracking error signal generator includes an operational amplifier.

3. The tracking error control system according to claim 1 wherein said DC detector includes:

a resistor coupled to the output of said racking error signal generator;

a capacitor coupled to said resistor and said reference voltage; and a signal output end disposed at a node between said resistor and said capacitor and outputting therefrom a low-pass voltage signal indicative of said direct current voltage of said tracking error signal.

4. The tracking error control system according to claim 1 further comprising a discriminator in communication with said comparator, which detects a seeking operation of said optical pickup head according to a TEZC signal.

5. A tracking error control method for use in an optical reproducing/recording apparatus, comprising steps of:

a) operating optical signals received by an optical pickup head of said optical reproducing/recording apparatus with an offset signal to generate a tracking error signal;

b) detecting a direct current voltage of said tracking error signal;

c) adjusting said offset signal according to the comparing result of said direct current voltage with a reference voltage by a comparator in order to approximate said direct current voltage to said reference voltage in response to an enable signal input to said comparator, wherein said enable signal is input to said comparator when said optical pickup head performs an inward seeking operation; and d) repeating said step a) with said adjusted offset signal.

6. The tracking error control method according to claim 5 further comprising a step, before said step a), of detecting a seeking operation of said optical pickup head.

7. The tracking error control method according to claim 5 wherein said inward seeking operation starts from an outer edge portion of the optical disc.

8. The tracking error control method according to claim 5 wherein an offset voltage indicated by said offset signal is lowered when said direct current voltage is greater than said reference voltage, and said offset voltage is enlarged when said direct current voltage is no greater than said reference voltage.

9. The tracking error control method according to claim 8 wherein a plurality of levels of said offset voltage are preset for selectively responding to the comparing result of said direct current voltage with said reference voltage.

10. The tracking error control method according to claim 5 wherein said direct current voltage is a low-pass signal of said tracking error signal.

11. A tracking error control method for use in an optical reproducing/recording apparatus, comprising steps of:

generating a tracking error signal in response to optical signals received by an optical pickup head of said optical reproducing/recording apparatus and an offset voltage;

dynamically detecting and outputting a direct current voltage of said tracking error signal by a DC detector, wherein said direct current voltage is optionally compared with a reference voltage by a comparator according to an enable signal input to said comparator, wherein said enable signal is input to said comparator when said optical pickup head performs an inward seeking operation;

lowering said offset voltage to reduce said direct current voltage of said tracking error signal to approximate said direct current voltage to said reference voltage when said direct current voltage is greater than said reference voltage; and enlarging said offset voltage to raise said direct current voltage of said tracking error signal to approximate said direct current voltage to said reference voltage when said direct current voltage is less than said reference voltage.

12. The tracking error control method according to claim 11 wherein said tracking error signal is generated by an operational amplifier coupled to said optical pickup head.

13. The tracking error control method according to claim 12 wherein said direct current voltage is a low-pass signal of said tracking error signal.

14. The tracking error control method according to claim 11 wherein said inward seeking operation starts from an outer edge portion of the optical disc.

* * * * *

UNITED STATES PATENT AND TRADEMARK OFFICE
CERTIFICATE OF CORRECTION

PATENT NO. : 7,668,050 B2  Page 1 of 1
APPLICATION NO. : 11/023072
DATED : February 23, 2010
INVENTOR(S) : Lin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 975 days.

Signed and Sealed this

Seventh Day of December, 2010

David J. Kappos
*Director of the United States Patent and Trademark Office*